Feb. 10, 1942.  K. JORGENSEN  2,272,208
BOTTLE FILLING MECHANISM
Filed Jan. 28, 1939  2 Sheets-Sheet 1
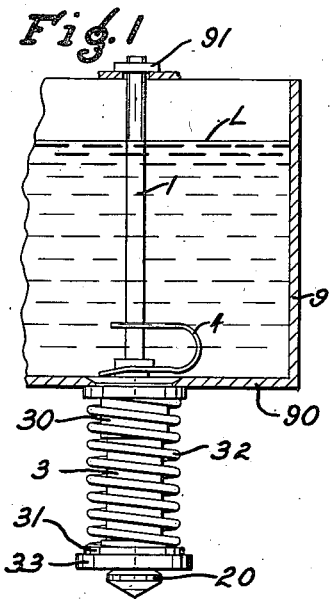
Fig. 1
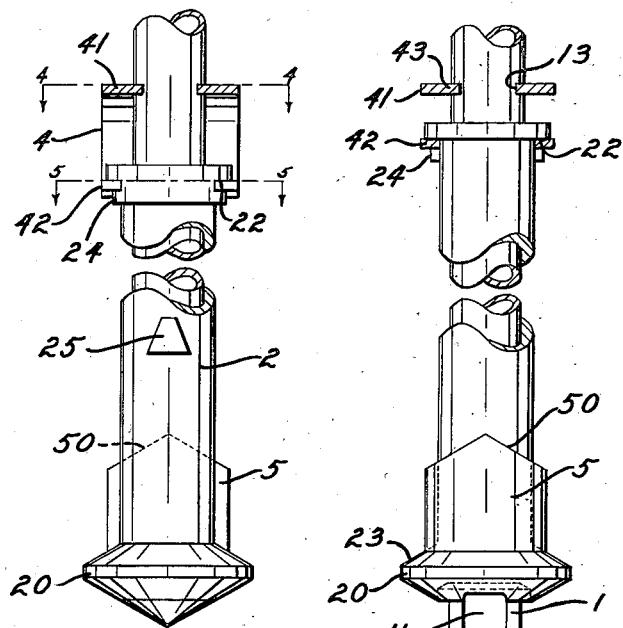
Fig. 2
Fig. 3
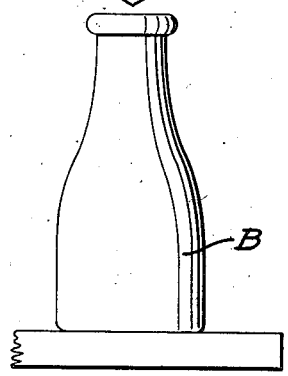
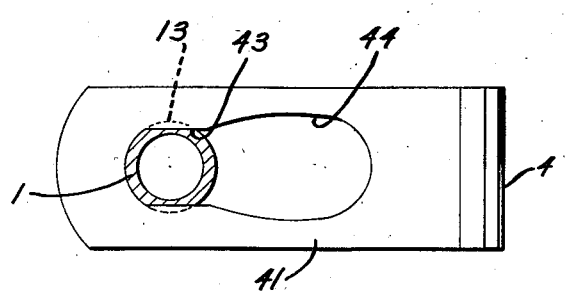
Fig. 4
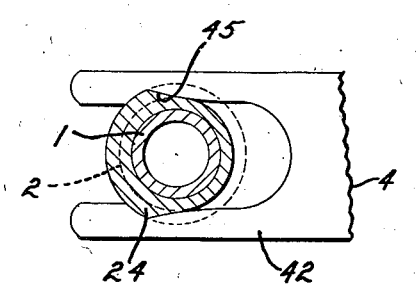
Fig. 5
Inventor
Karl Jorgensen
By
Charles L. Reynolds
Attorney Feb. 10, 1942. K. JORGENSEN 2,272,208
BOTTLE FILLING MECHANISM
Filed Jan. 28, 1939 2 Sheets-Sheet 2
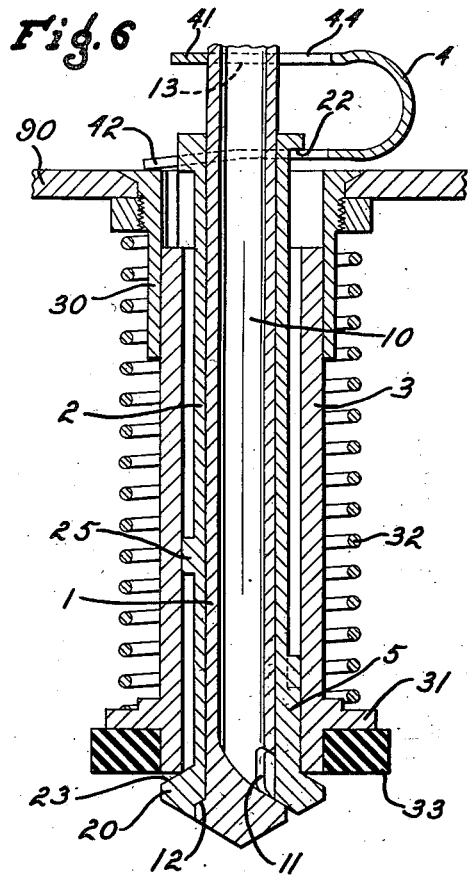
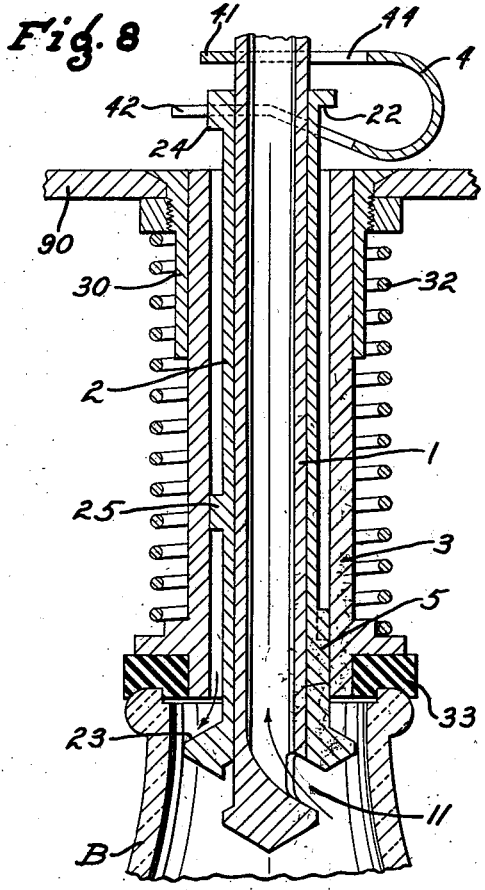
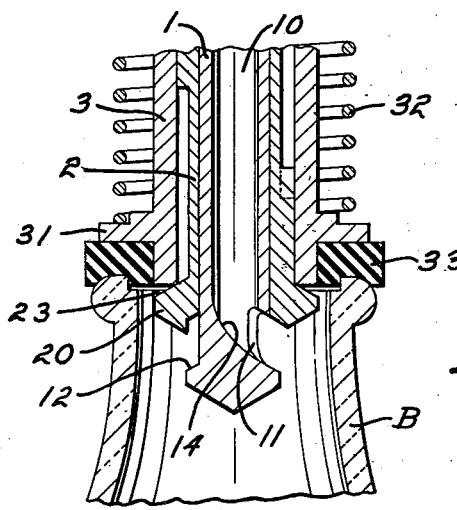
Inventor
Karl Jorgensen
By Charles L. Reynolds
Attorney Patented Feb. 10, 1942

2,272,208

UNITED STATES PATENT OFFICE 2,272,208

BOTTLE FILLING MECHANISM

Karl Jorgensen, Seattle, Wash.

Application January 28, 1939, Serial No. 253,437

18 Claims. (Cl. 226—124)

My invention relates to mechanism for filling bottles, and is best illustrated in conjunction with the operation of filling milk bottles. The same mechanism and the same type of bottles are used for various milk products which vary in viscosity, from skim milk through whole milk, commercial cream, heavy cream, and buttermilk, and in part the problems involving such filling devices arise from such a variation in viscosity as is represented between the extremes of the named milk products, for it is readily understandable that skim milk and whole milk will flow with comparative freedom, whereas a heavy, viscous liquid such as buttermilk or heavy cream will flow with much less freedom and liquidity, and will tend to clog or to remain longer within passages and apertures out of or over which the thinner liquids will pour without clogging.

While it will be understood that the invention may be employed for various types of liquids and in various types of filling machines, and no limitation in either respect is intended, it is particularly designed to operate with a filling machine of the general type illustrated in Patent No. 1,290,424. The particular valve mechanism herein illustrated is somewhat different, but in all such mechanisms a filling spout, in communication with a liquid reservoir above, is provided with valve means and with vent means, the whole extending within the open mouth of a bottle which is to be filled; the mouth of the bottle is sealed about the filling spout, and then the filling spout and the vent are opened, so that on the one hand the milk or other liquid may run into the bottle, and on the other hand the air, which is trapped within the bottle by sealing about its mouth, may escape to admit the liquid. All such filling mechanisms are of the general type described, as is the present device.

Ordinarily it is expected that the air will find its way out through the vents, and in most cases it does, but to insure that no air is trapped within the bottle, thus reducing the liquid contents, the vent and filling spout are left open in excess of the time required to fill the bottle (at least, longer than is necessary for the thinner liquids), with the result that the liquid usually rises in the vent tube, and must be trapped therein for subsequent discharge into the next bottle, else it spills out and is wasted. The cross-sectional area of the filling spout and of the vent tube should be substantially equal, and this spilling, if permitted, entails a considerable loss in the aggregate. Valve means have been devised to trap this liquid within the vent tube and to discharge it within the next bottle, and such mechanism per se is not part of my invention, but it does require particular timing mechanism to control the valve means, and further complicates the problem of properly venting each bottle in turn, particularly with heavy liquids, and it is to the latter phase of the problem that the present invention is directed.

As will be evident, when a quantity of liquid which has risen within a vent tube becomes trapped therein, and subsequently is released for discharge, the movement of the trapped liquid within the vent tube is in the direction opposite to that in which the air tends to move through the vent tube in escaping from the bottle, and the bottle cannot be filled properly until the vent tube has been completely discharged of its entrapped liquid contents. If during the escape from the vent tube of the entrapped liquid the filling spout opens, pressure immediately builds up within the bottle, due to the attempt of the air to escape, which is resisted by the attempt of the entrapped liquid to flow out of the vent tube, and when the liquid is a heavy viscous liquid, such as buttermilk or heavy cream, it does not properly clear the vent tube, unless every effort be made to facilitate its rapid escape. Furthermore, once the vent tube is cleared of the entrapped liquid, precautions must be taken to prevent any reentrance of liquid until the bottle is completely full and the liquid overflowing from it tends to rise within the vent tube again, and my invention is particularly directed to the provision of means to prevent such reentrance of liquid within the vent tube during normal inflow of liquid into the bottle, to the ultimate end of facilitating outflow of air and inflow of liquid by complete segregation of their conduits.

In so doing I provide diverter means, which must be maintained in one position relative to the entrance to the vent, and since the diverter means is on one or the other of two normally relatively rotatable tubes, which tubes must also be relatively axially movable, and since it is not feasible, in apparatus handling liquid containing butter fat, which tends to congeal in keyways, to employ such interlocking keys and keyways, it is a further object to provide practical means to prevent such relative rotation between the tubes without restricting or altering their necessary relative axial movements.

It is common in such filling mechanism to employ a U-shaped spring, cooperating between the valve and another tubular member which contains an aperture or passage that is to be closed by the valve at times. Such springs are normally submerged beneath the surface of the liquid, and within the liquid reservoir, and since milk is opaque, these springs cannot be observed in use. They are normally bifurcated at their ends for engagement with the respective tubes, and not infrequently these springs slide off in use, and lie at the bottom of the reservoir, placing the particular valve out of commission, but additionally, because they are not observed, they permit parts of the mechanism to drop down from the normal position, or to fail to rise properly, in any event, to fail to disengage a bottle properly, with the result that they are not infrequently broken off, or the bottle is broken, in either case wasting milk, and if the mechanism is broken, usually entailing the loss of a large part of the milk which is within the reservoir. These difficulties ensue in large measure because of the accidental disengagement of the springs from the tubular members with which they are normally engaged, and yet no way has been found heretofore to prevent this. It is a further object of the present invention to provide such springs, and to engage them with the tubular members in such a way that the springs cannot be accidentally disengaged, thereby obviating the disadvantages arising from disengagement of the springs, and it is a further and associated object to form such springs in such a way that they will additionally prevent rotation between the tubular elements, thereby to maintain the diverter, referred to above, in proper relation to the parts with which it cooperates.

The invention will be more clearly understood from the attached drawings and from this specification, in which it is shown and described in a preferred form, and the principles thereof which are believed to be new will be particularly pointed out in the claims which terminate this specification.

Figure 1 is an elevation of the mechanism which controls the filling of a bottle, with the bottle shown in operative position with relation to it, just prior to starting the filling operation, the reservoir, however, being shown in section.

Figure 2 is a side elevation of the mechanism that controls the filling, with parts in closed position, and Figure 3 is a similar view showing parts in open position.

Figure 4 is a plan view of the U-shaped spring, taken substantially on the line 4—4 of Figure 2, and Figure 5 is a similar view taken substantially on the line 5—5 of Figure 2.

Figure 6 is an axial section through the mechanism for filling and controlling the filling of a bottle, with parts shown in closed position; Figure 7 is a similar view showing parts partly open, that is to say, with the vent only open; and Figure 8 is a similar view, showing parts fully open, that is, with the vent and the filling spout both open.

It may be noted here that the views of Figures 2 and 3 are taken at 180° relative to each other, and each of them is taken at 90° relative to the position of parts as shown in Figures 6, 7, and 8.

The liquid reservoir or milk bowl 9 is kept normally filled with milk, to a level indicated by the line L. In its bottom 90 it is provided with a hole or holes, through which the milk drains into a filling spout depending beneath, which spout is usually made up of two telescopically connected tubular parts 3 and 30, the nipple 30 being secured and sealed in the aperture in the bottom 90 of the reservoir, and the part 3 being slidable axially in the fixed nipple 30, and having a shoulder 31 at its lower end, a spring 32 being interposed between the bottom 90 and the shoulder 31 to urge the tubular part 3 downwardly. Beneath its flange 31 it is usually provided with a collar 33 of yieldable material, as rubber, which is intended to be engaged by the mouth of a milk bottle and to form a tight seal thereabout. The tube 3, then, in effect constitutes the filling spout.

This tube is closed at its lower end, and held against downward movement beyond a given limit by valve mechanism. The particular valve mechanism herein shown and about to be described is preferred because it cuts off the supply of liquid at the point of entrance to the bottle, and therefore prevents drip in the largest degree possible. At the same time other types of valve mechanism may be employed, in so far as the remaining features of my invention are concerned. As herein shown the valve includes a tube 2, extending upwardly through and spaced from the filling spout 3, to provide a space through which the liquid may run, and carrying an enlarged head 20 at its lower end, having a seating surface 23 upon which the lower end of the filling spout 3 seats. The latter is urged thus to its seat upon the inclined surface 23 by the spring 32, and is normally held seated under the influence of this spring 32. The upper end of the valve tube 2 extends within the reservoir 9.

Since the valve 2 prevents and limits downward movement of the filling spout 3, it is necessary, of course, to limit downward movement of the valve tube. This is accomplished, and the valve tube is caused further to control the opening and closing of an air vent, by providing a vent tube 1, having a hollow axial bore 10, and provided at its lower end with an enlargement having a seating surface 12, whereon the end of the valve enlargement 20 seats. Above this seating surface 12 the vent conduit 10 is provided with an entrance 11, opening at one side only, which entrance is closed by the seating of the valve tube upon the surface 12, and this seating of the valve tube is accomplished under the influence of the spring 32 acting through the seating of the filling spout 3 upon the surface 23, and thereby urging the valve tube downwardly. Thus the valve 2 is double acting, closing both the spout 3 and the vent tube 1, by independent movement with respect to each. The vent tube 1 is suitably held in a bracket 91 (see Figure 1), preferably located at the top of the reservoir, above the milk level L, hence it will be seen that the vent tube 1 extends upwardly above any possible level of the milk in the reservoir. It will be seen, too, that if the vent tube 1 breaks off below the bottom 90, the entire mechanism falls. Should the vent tube break above the bottom, a spring 4, later described, may support it, and the other tubes dependent thereon for support.

It is preferred that the vent tube 1 be opened before opening of the filling spout; therefore the operation of the control mechanism is so arranged that the entrance 11 to the vent conduit is opened prior to the unseating of the filling spout 3 from the valve seat 23. Such a position of the parts is shown in Figure 7. This is accomplished by engagement of the mouth of a milk bottle B with the rubber seal 33, by upward movement of the bottle, the upward movement in opposition to the spring 32 being continued (by mechanism not herein shown and the exact nature of which is not material, but which is known in the art) until the entrance 11 to the vent is open. While this also tends to draw the spout 3 upwardly relative to the valve tube 2, to open the valve at 23, no such opening occurs initially, for the reason that the tube 2 is also urged upwardly by a spring 4, as will appear later; the tube 2 therefore initially moves upwardly coincidentally with the spout 3, its surface 23 is still urged upwardly against the spout 3, and the valve remains closed.

In this position of the parts any liquid which has been entrapped in the conduit or bore 10 of the vent tube 1 is permitted to drain into the bottle, thereby clearing the vent tube for the escape of air forced out from the bottle by the subsequently entering liquid.

It is necessary that the upward movement of the valve tube 2 be limited, and that the filler spout 3 be permitted to move upwardly beyond this upper limit of movement of the valve tube in order to unseat the filler spout from the seating surface 23. This is accomplished by engaging between the fixed vent tube 1 and the valve tube 2 spring means, which can be overcome by the spring 32, and which has a limited range of action, and which, after it has reached its limit of movement will stop the movement and support the weight of the valve tube 2, but will still permit the unimpeded further raising of the filling spout 3. Such spring means is normally a U-shaped leaf spring, and such a spring, altered, however, in its formation, is employed herein. Such a spring is illustrated at 4, and has the two arms 41 and 42. One of these arms, for instance the upper arm 41, engages shoulders formed upon the vent tube 1, while the lower arm 42 engages shoulders formed upon the valve tube 2. Since for reasons that have been suggested above and which will appear more clearly hereafter, it is desirable to prevent relative rotation between these two tubular elements, and in order to prevent accidental disengagement of the spring 4 from the tubes with which it is engaged, I provide in the vent tube 1 two parallel transverse and preferably coplanar slots or notches 13 (see Figures 2, 3, and 4), with which are engaged the parallel sides 43 of a keyhole aperture 44 formed in the upper arm 41 of the spring 4, and I likewise engage the lower arm 42 of the spring 4 non-rotatively with the valve tube 2. The use of opposite notches 13, instead of a circumferential groove, has the further advantage of weakening the tube 1 the least, thereby decreasing the possibility of its breakage, and consequent dropping of the entire mechanism and loss of liquid.

Non-rotative engagement of the arm 42 with the tube 2 may be accomplished in the manner indicated best in Figure 5. Just as the slots 13 define shoulders on the tube 1 with which the arm 41 is engaged, so the tube 2 is provided with a shoulder 22, beneath which the arm 42 of the spring may engage, this lower arm 42 being bifurcated to straddle the tube 2, and to come up underneath the shoulder 22. To prevent relative rotation between the tube 2 and the spring 4, as such rotation is prevented between the spring 4 and the tube 1 by the parallel edges 43 closely received in the slot 13, the edges of the furcation are made non-circular, as by providing them with notches 45, and the tube 2, just beneath the shoulder 22, is formed with an enlargement 24, which fits the non-circular notches 45.

Now, as is evident, the spring 4 may be slid down the vent tube 1, the larger part of its keyhole aperture 44 encircling the vent tube, and with the plane of the spring or of its arm 41 inclined considerably, relative to the axis of the tube, so that the furcations of the lower arm 42 are to one side of the tube. Now, when the spring has reached the proper point in the length of the vent tube and of the valve tube, assembled upon the vent tube, the edges 43 are engaged in the notches 13, and the furcation of the lower arm 42 straddles and comes up from beneath the enlargement 24 to engage the under side of the shoulder 22. In this position, shown in Figures 5, 6, and 8, it is practically impossible for the spring to be accidentally disengaged, for the tendency is for the closed end of the spring to move away from the axis of the tubes, and this is positively prevented because the aperture 44 is closed. It is not a mere furcation, as in such springs previously, but is closed at its end, and is thereby prevented from backing off and disengaging the vent tube 1, and since it cannot readily tilt, because of the close engagement of the edges 43 within the notches 13, it is, practically speaking, impossible for the furcated arm 42 to back off or become disengaged from the tube 2.

It will be seen that in the position of Figure 6 the spring 4 has been stressed by separating its arms 41 and 42 a greater distance than they would be if the spring were relaxed, and this has been accomplished under the influence of the spring 32 of superior strength. In the position of Figure 7 the spring 4 has been largely relaxed, but still urges the valve surface 23 upwardly against tube 3 to support the weight of the valve tube 2, and to prevent discharge of milk. The spring 32 to some extent presses the filling spout 3 downwardly, against the surface 23 and the filling spout does not open, hence no liquid enters the bottle except that which previously was entrapped in the bore 10 of the vent tube. This entrapped liquid quickly runs out, since there is no substantial opposition to its entering the bottle, and in particular because the bottom of the vent tube, at 14, is smoothly curved laterally to facilitate to the utmost the running out of the liquid. Now as upward movement of the bottle continues, the filling spout 3 is pressed further upward, to the position of Figure 8, and since the spring 4 is now wholly relaxed there is no longer anything urging the valve tube 2 further upward against the end of the filling spout 3. The latter rises from the seat 23 and liquid begins to enter the bottle, as indicated in Figure 8, and the air which is displaced flows out of the now empty vent tube 1, also as indicated in Figure 8.

Heretofore there has been no attempt, especially where such separate tubes have been used, to segregate the inflowing liquid from the outflowing air. The vent tube merely has opened at the bottom, and the inflowing milk has flowed all around it as a curtain, or the vent tube has opened laterally, but still the liquid has been permitted to flow down and around about it. Where the liquid is milk, this may operate sufficiently satisfactorily, since the liquid is comparatively thin and free-flowing, but where a heavy or viscous liquid, such as buttermilk or heavy cream, is filled into the bottles, this heavier liquid flows more slowly, does not clear the vent bore 10 as quickly, tends to be held therein by the too quick opening of the filling spout, and tends to be drawn back up the vent by the pressure of the air seeking to escape from within the bottle. This is aggravated by the fact that the heavy liquid tends to cling more closely to all the surfaces over which it runs, and therefore, instead of spilling out to the sides over the surface 23, it tends to run back down the under side of the enlargement 20, and thereby to enter and clog the entrance 11 to the vent tube. The result is that the bottle is not properly filled, is not properly vented, and delays occur.

To avoid all these drawbacks I have provided a diverter 5, which is interposed in the annular space between the valve tube 2 and the filling spout 3, just above the location of the entrance 11 to the vent tube. This diverter may have oppositely inclined upper surfaces 50, whereby the inflowing liquid is diverted to opposite sides and tends to flow into the bottle elsewhere than immediately above and around the vent entrance 11; that is to say, it tends to enter at the opposite side of the bottle, and is diverted away from the entrance 11 to the vent. Thus there is effected a segregation of the inflowing liquid and of the out-flowing air, and regardless of the nature or consistency of the liquid it is extremely unlikely that it will reach the entrance 11 during the filling operation; that is to say, not until the liquid level within the bottle has risen above the mouth of the bottle, and the liquid begins to flow upward within the vent tube. At this time, of course, it is no longer material whether the vent entrance be protected or not, since all the air has escaped from the interior of the bottle. The diverter 5 would serve its purpose as well were it formed upon the inside of the filler spout 3, or upon the outside of the valve tube 2. It is shown as formed upon the valve tube 2. Since the valve tube is held against rotation relative to the fixed vent tube by the spring 4, as described above, it is evident that the diverter 5 is held against rotation relative to the vent entrance 11. Since the valve tube and the filling spout are spaced apart a spacer or guide lug 25 may be provided on the valve tube 2, on the side opposite the diverter 5, to cooperate with the latter in maintaining the tubes coaxial.

What I claim as my invention is:

1. Mechanism to control the filling of a bottle from a liquid reservoir, comprising, in combination, a filling spout depending from the reservoir, a separate vent pipe extending above the liquid level in the reservoir, having its lower end disposed to enter the mouth of a bottle when the latter is in filling position relatively to the filling spout and a double acting valve member movable with respect to said vent pipe and relative to said filling spout, and operable successively to open the vent pipe, to open the filling spout, to close the latter, and to close the vent pipe.

2. Mechanism to control the filling of a bottle from a liquid reservoir, comprising, in combination, a filling spout depending from the reservoir, a separate and single vent pipe extending above the liquid level in the reservoir, and having an entrance at its lower end opening to one side, such lower end being disposed to enter the mouth of a bottle when the latter is in filling position relatively to the filling spout, valve means carried by said vent pipe and operable successively to open the vent pipe, to open the filling spout, to close the latter, and to close the vent pipe, means engageable by and sealed about the mouth of the bottle, thus to operate said valve means by movement of the bottle, and means disposed to divert liquid inflow, upon opening of the filling spout, towards the side of the bottle which is opposite that adjacent the entrance to the vent pipe, whereby to achieve separation of inflow and outflow.

3. Mechanism to control the filling of a bottle from a liquid reservoir, comprising, in combination, a vent pipe extending above the liquid level in the reservoir, and having its lower end disposed to enter the mouth of a bottle and affording entrance into one side of the vent for flow of air from the bottle, a tubular valve slidable along said vent pipe to open or close the latter's lower end, a filling spout spaced concentrically about the vent pipe and valve, and movable axially with and with respect to the valve, and cooperable with the latter to open the filling spout for flow of liquid therethrough into the bottle, or to close the filling spout, means associated with said filling spout operable to direct such flow of liquid in a stream diverted from the flow of air entering said vent, and means engageable by and sealed about the mouth of the bottle and operatively connected to the valve and spout, whereby, by movement of the bottle, successively to open the vent pipe, to open the filling spout, to close the latter, and to close the vent pipe.

4. Mechanism to control the filling of a bottle from a liquid reservoir, comprising, in combination, a vent pipe fixed in position and having its open lower end opening to one side and disposed to enter the mouth of a bottle which is in filling position, a tubular valve fitting closely about the vent pipe, and normally closing the vent pipe's lower opening, but slidable upwardly to a limited extent, to open the latter, a filling spout communicating with the reservoir and spaced about the valve, and guided for axial movement, the filling spout in its lowermost position engaging the valve to close the spout, and in moving to its uppermost position moving beyond the upward limit of movement of the valve to open the spout, means operable upon upward movement of the filling spout to lift the valve to its upward limit, means engageable by and sealed about the mouth of the bottle, and operatively connected to the filling spout to lift the latter, and means to divert liquid entering the bottle away from the vent's side-opening lower end.

5. Mechanism to control the filling of a bottle from a liquid reservoir, comprising, in combination, a vent pipe having its lower end opening to one side and disposed to enter the mouth of a bottle which is in filling position, a tubular valve normally closing the vent pipe's lower opening, and slidable upwardly to open the same, a filling spout communicating with the reservoir, spaced concentrically about the valve, the valve and the filling spout normally cooperating to close the filling spout, and the filling spout being movable axially with and with respect to the valve, means engageable by and sealed about the mouth of the bottle, and operatively engaged with the filling spout to lift the spout, yieldable means acting upon the valve through a limited distance to lift the valve as the filling spout is thus lifted, thereby to maintain the filling spout closed while opening the vent pipe, the filling spout being opened by its further lifting relative to the valve, beyond the valve's limit of lifting, the filling spout and vent being closed in reverse order by lowering of the filling spout and its bottle-operated means, and means interposed between the valve and the filling spout, above the side-opening vent, to divert liquid, as it enters the bottle, from the vent.

6. Mechanism to control the filling of a bottle from a liquid reservoir, comprising, in combination, a filling spout depending from the reservoir, a separate vent pipe within the filling spout and extending above the liquid level in the reservoir, and having an entrance at its lower end opening to one side, such lower end being disposed to enter the mouth of a bottle when the latter is in filling position relatively to the filling spout, a tubular valve means surrounding the vent pipe, and slidable axially relative to the vent pipe and the filling spout, successively to open the vent pipe, to open the filling spout, to close the latter, and to close the vent pipe, means to divert liquid inflow, upon opening the filling spout, away from the now-open entrance of the vent pipe, and means interengaged between the vent pipe and the diverting means to prevent relative rotation therebetween.

7. Mechanism to control the filling of a bottle from a liquid reservoir, comprising, in combination, a filling spout depending from the reservoir, a separate vent pipe within the filling spout and extending above the liquid level in the reservoir, and having an entrance at its lower end opening to one side, such lower end being disposed to enter the mouth of a bottle when the latter is in filling position relatively to the filling spout, a tubular valve means surrounding the vent pipe, and slidable axially relative to the vent pipe and the filling spout, successively to open the vent pipe, to open the filling spout, to close the latter, and to close the vent pipe, means formed upon the valve means, and disposed relatively to the vent's entrance, to divert liquid inflow, upon opening the filling spout, away from the now-open entrance to the vent pipe, and means interengaged between the vent pipe and the tubular valve means to prevent relative rotation therebetween.

8. Mechanism to control the filling of a bottle from a liquid reservoir, comprising, in combination, a filling spout depending from the reservoir, a separate vent pipe within the filling spout and extending above the liquid level in the reservoir, and having an entrance at its lower end opening to one side, such lower end being disposed to enter the mouth of a bottle when the latter is in filling position relatively to the filling spout, a tubular valve means surrounding the vent pipe, and slidable axially relative to the vent pipe and the filling spout, successively to open the vent pipe, to open the filling spout, to close the latter, and to close the vent pipe, means formed upon the valve means, and disposed relatively to the vent's entrance, to divert liquid inflow away from such entrance upon opening the filling spout, and a U-shaped spring engaged non-rotatively with the vent pipe by one end and non-rotatively with the tubular valve means by its other end, to prevent relative rotation between the members thus engaged, and further reacting axially between such two members to tend to open the vent pipe.

9. Mechanism to control the filling of a bottle from a liquid reservoir, comprising, in combination, a filling spout depending from the reservoir, a separate vent pipe within the filling spout and extending above the liquid level in the reservoir, and having an entrance at its lower end opening to one side, such lower end being disposed to enter the mouth of a bottle when the latter is in filling position relatively to the filling spout, a tubular valve means surrounding the vent pipe and slidable axially relative to the vent pipe and the filling spout, successively to open the vent pipe, to open the filling spout, to close the latter, and to close the vent pipe, means formed upon the valve means, and disposed relatively to the vent's entrance, to divert liquid inflow away from such entrance upon opening the filling spout, a U-shaped spring within the liquid reservoir formed for non-rotative engagement with the vent pipe by one end and for non-rotative engagement with the tubular valve means by its other end, to prevent relative rotation between the members thus engaged, and further reacting axially between such two members through a limited distance to tend to raise the valve means and to open the vent pipe, and spring means active to urge the filling spout downwardly to retain the latter closed, and also to overcome the tendency of the U-shaped spring to open the vent pipe, and means engageable by a bottle and operatively connected to the filling spout to raise the latter, past the limit of movement under the influence of the U-shaped spring, thereby to accomplish the specified sequence of opening, and upon retraction permitting reverse movement of the parts under the influence of said spring means, thereby to accomplish the specified sequence of closing.

10. Mechanism to control the filling of a bottle from a liquid reservoir, comprising, in combination, a vent pipe fixed in position and having its open lower end opening to one side and disposed to enter the mouth of a bottle which is in filling position, a tubular valve fitting closely about the vent pipe, and normally closing the vent pipe's lower opening, but slidable upwardly to a limited extent, to open the latter, a filling spout communicating with the reservoir and spaced about the valve, and guided for axial movement, the filling spout in its lowermost position engaging the valve to close the spout, and in moving to its uppermost position moving beyond the upward limit of movement of the valve to open the spout, means operable upon upward movement of the filling spout to lift the valve to its upward limit, means engageable by and sealed about the mouth of the bottle, and operatively connected to the filling spout to lift the latter, diverter means disposed in the space between the valve and the filling spout, about the vent's side-opening lower end, to divert liquid entering the bottle away from the lower entrance to the vent, and means interengaged between the fixed vent pipe and said diverter means to prevent relative rotation therebetween.

11. Mechanism to control the filling of a bottle from a liquid reservoir, comprising, in combination, a vent pipe fixed in position and having its open lower end opening to one side and disposed to enter the mouth of a bottle which is in filling position, a tubular valve fitting closely about the vent pipe, and normally closing the vent pipe's lower opening, but slidable upwardly to a limited extent, to open the latter, a filling spout communicating with the reservoir and spaced about the valve, and guided for axial movement, the filling spout in its lowermost position engaging the valve to close the spout, and in moving to its uppermost position moving beyond the upward limit of movement of the valve to open the spout, means operable upon upward movement of the filling spout to lift the valve to its upward limit, means engageable by and sealed about the mouth of the bottle, and operatively connected to the filling spout to lift the latter, means formed upon the valve, filling the space between the latter and the filling spout above the vent's side-opening lower end, to divert liquid entering the bottle away from the lower entrance to the vent, and means interengaged between the fixed vent pipe and the valve, to prevent relative rotation therebetween.

12. Mechanism to control the filling of a bottle from a liquid reservoir, including a tubular vent member opening at one side at its bottom, a surrounding tubular valve, and a surrounding tubular filling spout communicating with the reservoir, one of said tubular elements being fixed in position and the other two being axially movable jointly and relatively, and cooperating thereby successively to open the vent, to open the filling spout, to close the latter, and to close the vent, a diverter formed upon the valve, above the side-opening of the vent's lower end, to divert entering liquid away from such opening, a U-shaped spring one arm of which is non-rotatively engaged with the vent member, and the other arm whereof is non-rotatively engaged with the valve, to prevent rotation of the valve-carried diverter relative to the vent's side opening, and said spring further acting upon the valve to effect joint movement upward of the valve and of the filling spout, to keep the latter closed while opening the vent.

13. In combination with a liquid reservoir, bottle filling mechanism including two concentric, transversely shouldered, and relatively axially movable elements defining respectively a conduit and a valve to close the same, and depending from and at least one of which projects upwardly within the liquid reservoir, a U-shaped spring, one arm whereof is bifurcated and formed with a notch facing inwardly from the end of a furcation, one of said elements being complementally formed, and such bifurcated arm engaging it to prevent inadvertent disengagement therefrom by relative movement lengthwise of the spring arm, and also engaging a shoulder thereon, the other arm whereof engages a shoulder on the other element, thereby tending to effect relative axial movement of said elements so long as said U-shaped spring is stressed, thus to open the valve, and further and stronger spring means reacting between the two elements to close the valve in opposition to the U-shaped spring.

14. In combination with a liquid reservoir, bottle filling mechanism including two concentric, transversely shouldered, and relatively axially movable elements defining respectively a conduit and a valve to close the same, and depending from and at least one of which projects upwardly within the liquid reservoir, a U-shaped spring within the reservoir, one arm whereof is apertured to encircle one of said tubular elements, and to engage the shoulder thereon, the other arm whereof is bifurcated and formed with notches facing inwardly from the end of the furcations, the other element being complementally formed, and the furcated arm engaging such other element to prevent inadvertent disengagement therefrom by relative movement lengthwise of the spring arm, and engaging also the shoulder on such other element, thereby tending to effect relative axial movement of said elements so long as said U-shaped spring is stressed, thus to open the valve, and superior spring means operatively connected between the two elements to close the valve in opposition to the U-shaped spring.

15. In combination with a liquid reservoir, bottle filling mechanism including two concentric and relatively axially movable elements defining respectively a conduit and a valve to close the same, and depending from, and at least one of which projects upwardly within, the liquid reservoir, one of said elements having parallel transverse grooves at opposite sides, constituting shoulders, and the other of said elements likewise having a transverse shoulder, and a non-circular cross section immediately adjacent, a U-shaped spring within the reservoir, one arm whereof has a keyhole aperture to encircle the grooved element, and to engage the grooves non-rotatively by the smaller portion of such aperture, the other arm of the U-shaped spring being bifurcated to straddle the other element, and complementally shaped to engage its shoulder and to non-rotatively engage its non-circular cross section, the engagement of the respective shoulders tending to effect relative axial movement of the two elements so long as the U-shaped spring is stressed, and the non-rotative engagement of the spring with each of the two elements preventing relative rotation therebetween.

16. Mechanism to control the filling of a bottle from a liquid reservoir, comprising, in combination, a central vent pipe, a tubular valve snugly encircling said vent pipe to afford lateral support therefor and reciprocable axially relatively thereto for controlling flow through the vent pipe, and a filling spout encircling and spaced from said tubular valve and reciprocable axially relatively thereto, for controlling flow through the spout, said valve being movable successively to open the vent pipe, to open the filling spout, to close the latter, and to close the vent pipe.

17. Mechanism to control the filling of a bottle from a liquid reservoir, comprising, in combination, a central vent pipe, a tubular valve snugly encircling said vent pipe to afford lateral support therefor and reciprocable axially relatively thereto for controlling flow through the vent pipe, a filling spout encircling and spaced from said tubular valve and reciprocable axially relatively thereto independently of relative reciprocation of said vent pipe and valve, for controlling flow through the spout, and spacer means on said valve engaging said filling spout to afford lateral support for said valve and to guide the valve and spout for such relative reciprocation, said valve being movable successively to open the vent pipe, to open the filling spout, to close the latter, and to close the vent pipe.

18. In combination with a liquid reservoir, bottle filling mechanism including two concentric, transversely shouldered, and relatively axially movable tubular elements snugly telescoping to afford mutual lateral support therefor and defining respectively a central conduit and an encircling valve to close the same, and depending from and at least one of which projects upwardly within the liquid reservoir, a U-shaped spring having one end engaged with the shoulders of one of said tubular elements and the other end engaged with the shoulders of the other tubular element, thereby tending to effect relative axial movement of said tubular elements so long as said U-shaped spring is stressed, thus to open the valve, and means reacting between said two tubular elements to effect closing movement of the valve in opposition to the U-shaped spring.

KARL JORGENSEN.